United States Patent [19]

Weber et al.

[11] Patent Number: 4,560,833
[45] Date of Patent: Dec. 24, 1985

[54] METHOD AND APPARATUS FOR SIGNALING AN EXISTING TELEPHONE COMMUNICATION BETWEEN PICTURE TELEPHONE APPARATUSES

[75] Inventors: Jens Weber; Ernst-Michael Czempiel, both of Berlin, Fed. Rep. of Germany

[73] Assignee: Krone GmbH, Berlin, Fed. Rep. of Germany

[21] Appl. No.: 573,553

[22] Filed: Jan. 25, 1984

[30] Foreign Application Priority Data

Feb. 10, 1983 [DE] Fed. Rep. of Germany ....... 3304509

[51] Int. Cl.⁴ .............................................. H04N 7/14
[52] U.S. Cl. .................................... 179/2 TV; 358/85
[58] Field of Search .............. 179/2 TV, 2 TS, 2 DP; 358/85

[56] References Cited

U.S. PATENT DOCUMENTS

| | | | |
|---|---|---|---|
| 3,457,550 | 7/1969 | Gibson et al. ................ | 179/2 DP X |
| 3,692,938 | 9/1972 | Addeo ............................... | 179/2 TS |
| 3,933,233 | 1/1976 | Randmere et al. .............. | 179/2 TV |
| 3,946,158 | 3/1976 | Leclercq et al. ................. | 179/2 TV |
| 4,246,442 | 1/1981 | Hashimoto ....................... | 179/2 DP |

OTHER PUBLICATIONS

R. Francois et al, "Optical Fibres in Subscriber Loop Networks", *Communication & Transmission*, (Paris), N 2/3, 1982, pp. 119-136.
S. Hinoshita et al, "Optical Fiber Two-Way Wavelength-Division-Multiplex Video Transmission System", 3rd World Telecommunication Forum, Geneva, Switzerland, Sep. 19-26, 1979, pp. 3.2.4.1-3.2.4.3.
Pearson et al, "An Experimental Visual Telephone System for the Deaf", *Television*, vol. 16, No. 2, pp. 6-10, Mar./Apr. 1976.

*Primary Examiner*—Keith E. George
*Attorney, Agent, or Firm*—Weingarten, Schurgin, Gagnebin & Hayes

[57] ABSTRACT

The subject matter of the invention is a method and an apparatus for signaling an existing picture telephone communication for picture telephone apparatuses. The picture telephone apparatus (1) includes a transmitter (2) for transmitting a short identification signal upon lifting off the handset (1a) as a picture telephone identification signal (2a) through the audio channel, a detection circuit (3) for detecting an incoming picture telephone identification signal and an indication unit (D) for an acoustical and/or optical indication.

12 Claims, 2 Drawing Figures

METHOD AND APPARATUS FOR SIGNALING AN EXISTING TELEPHONE COMMUNICATION BETWEEN PICTURE TELEPHONE APPARATUSES

BACKGROUND OF THE INVENTION

The invention relates to a method and an apparatus for signaling an existing telephone communication between picture telephone apparatuses. In the near future there will be the possibility for picture telephone communication through a newly developed wide band glassfibre communication network.

A telephone apparatus is connected to a terminal which terminates the optical subscriber line and connected to a display apparatus, e.g. a television set.

The optical fibre is engaged bidirectionally with video signals and telephone signals to provide the picture telephone service. Also deaf persons have the possibility for a picture communication with other picture telephone subscribers by the picture telephone apparatus.

In the existing telephone communication networks todays, the known signaling method with different audio signals of a successful completed communication can only be understood inaccurately especially by persons with hearing loss.

It is therefore an object of the present invention to provide a method and an apparatus which can signalize an existing telephone communication unequivocally.

SUMMARY OF THE INVENTION

The method according to the invention for signaling an existing telephone communication between picture telephone apparatuses which accomplishes the above object is characterised by the following steps:

(A) generating an identification signal upon an arriving call and upon lifting a handset of the picture telephone apparatus of the called subscriber (subscriber B) as a picture telephone identification signal;

(B) transmitting said identification signal through the audio channel of the picture telephone transmission channel from the picture telephone apparatus of the called subscriber (subscriber B) to a picture telephone apparatus of a calling subscriber (subscriber A);

(C) receiving said identification signal by the picture telephone apparatus of said calling subscriber (subscriber A) upon the installation of a telephone communication;

(D) detecting said identification signal as a picture telephone identification signal by the picture telephone apparatus of said calling subscriber (subscriber A) and (E) generating an audio- and/or optical indication upon detecting said picture telephone identification signal by the picture telephone apparatus of a calling subscriber (subscriber A) indicating that the called subscriber has a picture telephone equipment.

The identification signal is advantageously generated and transmitted immediately after the hook switch of the picture telephone apparatus of the called subscriber (subscriber B) is switched on. A further advantage can be seen if the identification signal is generated only during a short time period so that it is terminated when the telephone handset is in its speech position.

The indication can be reset automatically after the elapse of a time period which is sufficient for understanding or by a manual reset of the calling subscriber.

A further advantageous embodiment according to the invention provides automatic activation of a display apparatus (e.g. a television apparatus) after the detection of the identification signal.

The apparatus according to the invention which accomplishes the above object includes a picture telephone apparatus, a picture telephone terminal apparatus and a display apparatus and is characterised in that each picture telephone apparatus comprises:

a detection circuit to detect an outgoing calling signal from the picture telephone apparatus, a detection circuit detecting an incoming calling signal from a local telephone exchange, a hook switch, a gate circuit which is controlled by said detection circuits at said hook switch, a timing circuit, a transmitter for transmitting a picture telephone identification signal and being controlled by said gate circuit, and a detection circuit for detecting said picture telephone identification signal and being controlled by said gate circuit;

that each picture telephone terminal apparatus comprises:

a terminal to a picture telephone network through a subscriber line, an opto/electrical-converter as a receiver, an electrical/optical-converter as a transmitter and a multiplexer for multiplexing wide band- and narrow band services; and that an indication means generates an indication upon receiving an output signal of the detection circuit detecting the picture telephone identification signal.

According to a first embodiment the indication is included in the picture telephone apparatus.

It is further advantageous that the indication is a unit of the display apparatus.

The indication unit can be an optical indication (display) or an audio indication or both.

It is advantageous to start the transmitter by an output signal of the gate circuit and to inhibit the transmitter by an output signal of the timing circuit which can be generated about 1 second after the transmitter has been started.

It is further advantageous that according to the invention there can be provided means to start the display apparatus automatically.

The following advantageous effects of the method and the apparatus according to the invention can be seen:

Subscribers which are provided with picture telephone apparatus can be selected easily from other subscribers. Furthermore, persons with hearing loss can understand by the visible display that a communication to a picture telephone subscriber exists.

BRIEF DESCRIPTION OF THE DRAWINGS

In the following an embodiment of the invention is described with reference to the figures.

DETAILED DESCRIPTION OF THE PREFERRED EMBODIMENT

Figure 1:
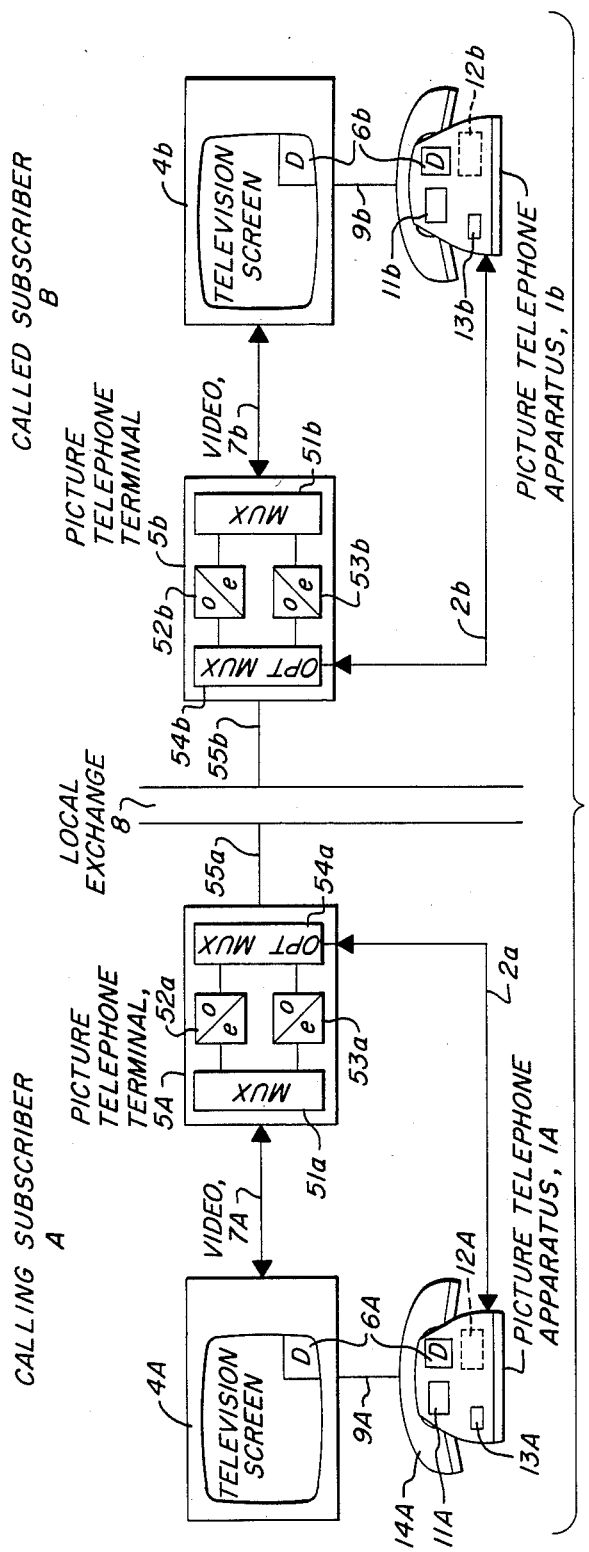
FIG. 1 shows an embodiment of the apparatus according to the invention at the location of the subscriber A and the location of the subscriber B.

The schematic diagram in FIG. 1 shows an embodiment according to the invention at the location of the subscriber A and the subscriber B. The apparatus of the subscriber A is identically the same as the apparatus of the subscriber B and both embodiments differ only in their function in establishing the connection, completing the connection and during an existing picture telephone connection.

In detail there are shown the following components in FIG. 1 referring to the components of subscriber:

A picture telephone apparatus 1a including a handset 14a, a telephone unit 11a with electronic equipments, a transmitter 12a for transmitting a picture telephone identification signal according to a multifrequency code (MFC), a detection circuit 13a for detecting a picture telephone identification signal wich is transmitted by the MFC method and an indication unit 6A (D);

a display apparatus 4a which can be a television apparatus and includes an indicator D; and a picture telephone terminal apparatus 5a with the following functional units:

a terminal unit 54a in connection to the glassfibre network through the glassfibre subscriber line 55a, an opto/electrical-converter 52a (o/e) as a receiver, an electrical/optical-converter 53a (o/e) as a transmitter and a multiplexer 51a (MUX) for multiplexing wide band services and narrow band services.

If a picture telephone communication exists the received and to be transmitted video signals are transmitted through a video transmission channel 7a from the picture telephone terminal apparatus 5a to the display apparatus 4a and vice versa.

The picture telephone identification signal 2a is transmitted through a separate channel from the picture telephone apparatus 1a to the picture telephone terminal apparatus 5a and vice versa.

Figure 2:
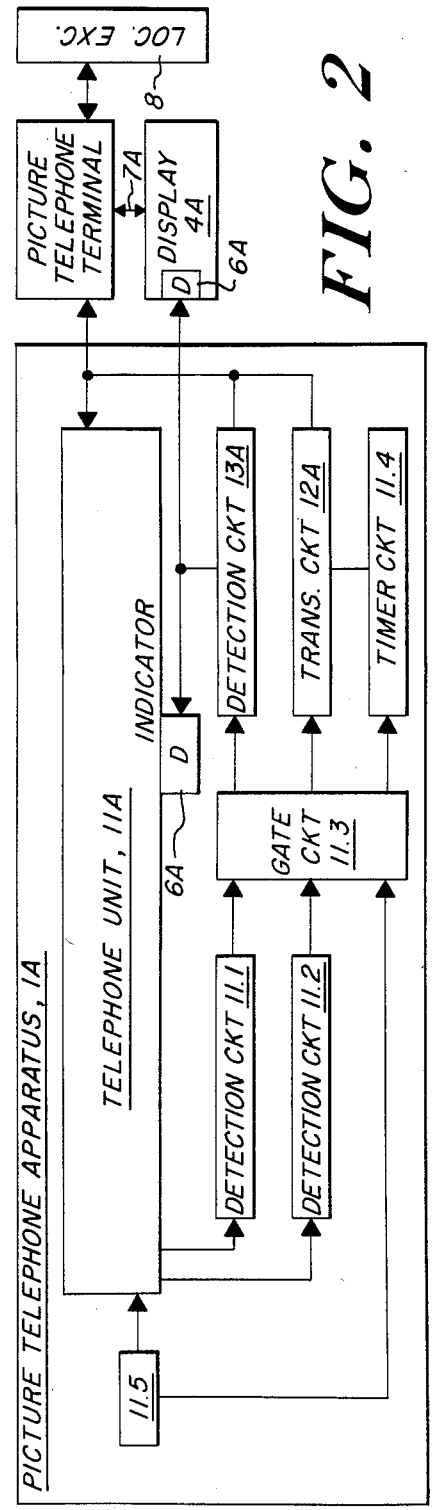
FIG. 2 shows a block diagram of a picture telephone apparatus shown in FIG. 1 according to the invention.

The block diagram which is shown in FIG. 2 shows in detail an embodiment according to the invention of the picture telephone apparatus 1a shown in FIG. 1. The picture telephone apparatus of the called subscriber has the identical construction.

The picture telephone apparatus 1a includes the following functional units: a detection circuit 11.1 for detecting an outgoing call (digital dialing), a detection circuit 11.2 for detecting an incoming call from the local telephone exchange 8, a known hook switch 11.5, a gate circuit 11.3 which is controlled by the hook switch 11.5 and the detection circuits 11.1 and 11.2 and controlling a timer circuit 11.4, the transmitter 12a and the detection circuit 13a.

FIG. 2 shows further the telephone unit 11a including electronic equipment and an indication unit 6a designated D which is controlled by the detection circuit 13a. The telephone apparatus 1a is connected to the display apparatus 4a and to the picture telephone terminal apparatus 5a.

In the following the operation of the embodiment of FIG. 2 is functionally described for the subscriber A where "A" represents the calling subscriber, and "B" represents the called subscriber.

If the handset 14a of the telephone apparatus 1a is lifted off, the hook switch 11.5 is activated and a call is transmitted from the picture telephone terminal apparatus 5a to the local exchange 8. The outgoing call is detected by the detection circuit 11.1 which initiates the detection circuit 13a through the gate circuit 11.3. If during the telephone communication the detection circuit 13a is receiving a signal and is identifying it as a picture telephone identification signal the result of the identification is indicated by the indication unit 6a (D) in the picture telephone apparatus and/or in the television apparatus 4a.

In the following the operation of the embodiment which is shown in FIG. 2 is functionally described for the subscriber B.

The detection circuit 11.2 of subscriber B detects a call which is incoming from a local exchange 8 through the picture telephone terminal apparatus 5b. Upon lift off of the handset 1a the output signal of the hook switch 11.5 and the output signal of the detection circuit 11.2 are supplied at the same time to the gate circuit 11.3. As a result the gate circuit 11.3 initiates the transmission of the picture telephone identification signal by the transmitter 12b and starts the timing circuit 11.4 simultaneously.

After the elapse of the time period which is generated by the timing circuit 11.4 the transmitter 2 is inhibited. For example, the inhibition happens 1 second after the beginning of the transmission of the picture telephone identification signal. As a result the picture telephone identification signal is terminated when the handset is in its speech position and the telephone conversation starts.

Based on a further advantageous development of the display apparatus 4 there can be provided means for automatically activating the display apparatus 4a and 4a by the output signal of the detection circuit 13a, 13b respectively.

We claim:

1. A method for signaling a capability of a picture telephone communication between picture telephone subscriber equipments each including a picture telephone apparatus having a handset, said telephone subscriber equipments being interconnected via a communications path including an audio channel in such a way as to constitute a calling subscriber and a called subscriber comprising the steps of:

generating an identification signal by a picture telephone apparatus of a called subscriber in response to a received call and upon lifting the handset of the picture telephone apparatus of the called subscriber as a picture telephone identification signal;

transmitting said identification signal through an audio channel of a picture telephone transmission channel from the picture telephone apparatus of the called subscriber to a picture telephone apparatus of a calling subscriber;

receiving said identification signal by the picture telephone apparatus of said calling subscriber;

detecting said identification signal as the picture telephone identification signal of said called subscriber by the picture telephone apparatus of said calling subscriber; and generating an indication signal upon detecting said picture telephone identification signal by the picture telephone apparatus of said calling subscriber indicating that the called subscriber has a picture telephone equipment.

2. The method of claim 1, wherein said picture telephone apparatus includes a hook switch activatable by lifting the associated handset, and wherein said generating step generates said identification signal immediately upon activation of said hook switch of the picture telephone apparatus of the called subscriber.

3. The method according to claim 1, further including the step of limiting the duration of the generated identification signal for a time period selected such that it is terminated when the handset is in its speech condition.

4. The method according to claim 1, further including a display apparatus operatively connected to each of said picture telephone apparatuses, and wherein said indication signal generating step includes the step of activating said display apparatus in response to the detection of said identification signal.

5. An apparatus for signaling a capability of a picture telephone communication between picture telephone subscriber equipments operatively coupled to a local telephone exchange, comprising:
- a picture telephone apparatus for providing outgoing calling signals and for receiving incoming calling signals;
- a picture telephone terminal apparatus connected to said telephone apparatus via an audio channel;
- a display apparatus connected to said picture telephone terminal apparatus via a video channel and connected to said picture telephone apparatus via a communication path;
- said picture telephone apparatus comprising;
  - a first detection circuit for providing a first signal in response to detecting an outgoing calling signal provided by the picture telephone apparatus;
  - a second detection circuit for providing a second signal in response to detecting an incoming calling signal from said local telephone exchange;
  - a hook switch for providing a signal indication representative of said picture telephone apparatus in an off-hook condition;
  - a gate circuit coupled to said first and to said second detection circuits and to said hook switch for providing enabling signals in response to said signal indication and to said first and to said second signals;
  - a timer circuit coupled to said gate circuit and responsive to said enabling signals for providing a timing signal;
  - a transmitter coupled to said gate circuit and to said timer circuit for transmitting a picture telephone identification signal via said local exchange in response to said enabling signals and to said timing signal provided by said timer circuit;
  - a third detection circuit coupled to said picture telephone terminal apparatus and to said gate circuit for detecting said picture telephone identification signal in response to said enabling signals;
- said picture telephone terminal apparatus comprising;
  - an opto/electrical converter for receiving signals from said local exchange;
  - an electrical/optical converter for transmitting signals to said local exchange; and
  - a multiplexer coupled to said converters for multiplexing wideband and narrowband services; and
- an indicator coupled to said third detection circuit for generating an indication signal in response to said third detection circuit detecting said picture telephone identification signal.

6. The apparatus of claim 5, wherein said indicator is coupled to said picture telephone apparatus.

7. The apparatus of claim 5, wherein said indicator is coupled to said display apparatus.

8. The apparatus of claim 6, wherein said indicator is an optical indicator.

9. The apparatus of claim 6, wherein said indicator is an audio indicator.

10. The apparatus of claim 5, wherein said transmitter includes means for enabling it in response to said enabling signals and for disabling it in response to said timing signal from said timer circuit.

11. The apparatus of claim 10, wherein said timing signal is generated for about one second after the start of said transmitter.

12. The apparatus of claim 5, further including means for activating the operation of said display apparatus.

* * * * *